J. KOHLER.
RESILIENT WHEEL.
APPLICATION FILED APR. 6, 1912.

1,056,554.

Patented Mar. 18, 1913.

2 SHEETS—SHEET 1.

Attest:
Chas. H. Buell.
Henry Moe

Inventor:
Joseph Kohler,
By Robert Binns, Atty.

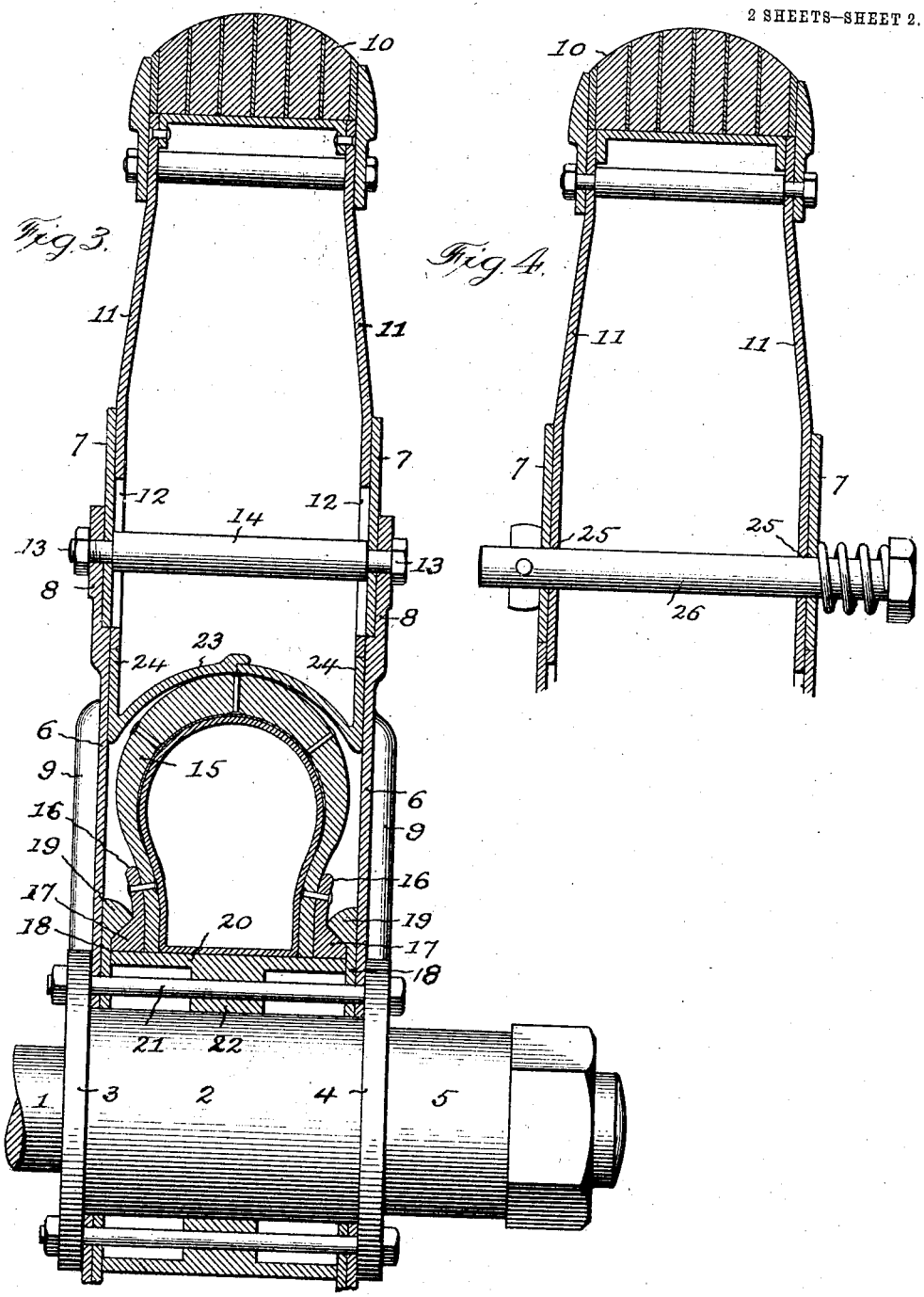

UNITED STATES PATENT OFFICE.

JOSEPH KOHLER, OF CHICAGO, ILLINOIS, ASSIGNOR OF ONE-HALF TO KITTIE COLLINS, OF CHICAGO, ILLINOIS.

RESILIENT WHEEL.

1,056,554.  Specification of Letters Patent.  Patented Mar. 18, 1913.

Application filed April 6, 1912. Serial No. 688,905.

*To all whom it may concern:*

Be it known that I, JOSEPH KOHLER, a citizen of the United States of America, and a resident of Chicago, in the county of Cook, State of Illinois, have invented certain new and useful Improvements in Resilient Wheels, of which the following is a specification.

This invention relates to that type of resilient wheels in which an annular pneumatic cushion is arranged between the tire and hub portions of the wheel to provide an intermediate resilient connection between the parts. And the present improvement has for its object to provide a simple and efficient structural formation and arrangement of parts whereby the same can be conveniently taken apart for repair and replacement, and a subsequent reassembly effected in a like ready and convenient manner.

A further object is to provide a convenient and substantial means for connecting the tire and hub portions together in a fixed and concentric relation in case of a puncture and deflation of the intermediate pneumatic cushion, all as will hereinafter more fully appear.

Figure 1:
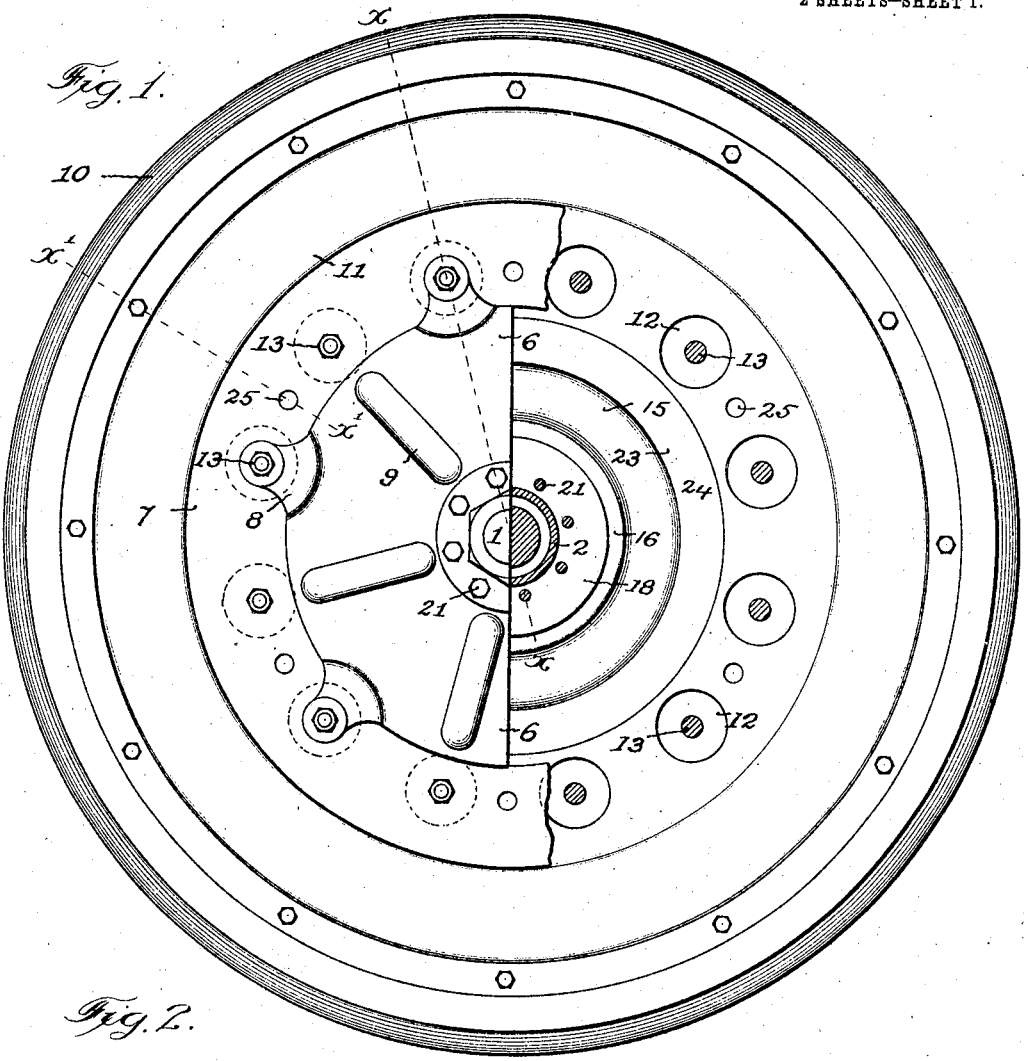
Figure 2:
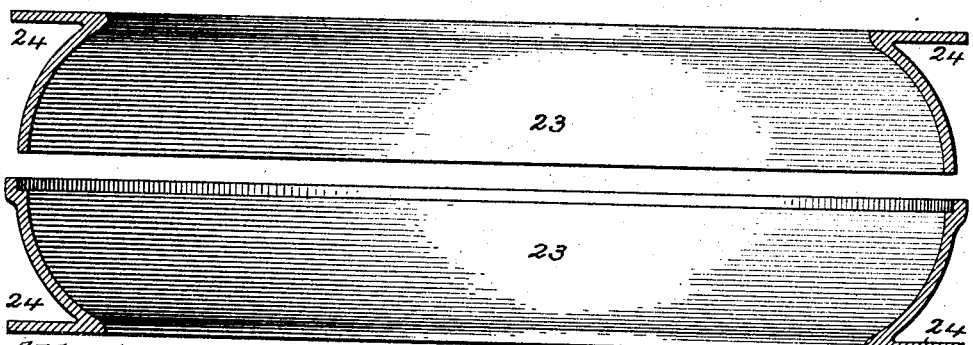

In the accompanying drawings: Figure 1, is a side elevation of a wheel embodying the present improvements, with parts removed and others in section. Fig. 2, is a central section of the outer annular saddle for the pneumatic cushion, detached. Fig. 3, is a detail transverse section, on line $x$—$x$, Fig. 1. Fig. 4, is a similar view, on line $x'$—$x'$, Fig. 1.

Similar reference numerals indicate like parts in the several views.

Referring to the drawings, 1 represents a portion of the axle upon which the hub 2 of the wheel is mounted in any usual manner to have rotation independent of the axle. In the present construction the hub 2 is provided at its inner end with a fixed bearing collar 3, and at its outer end has connection with a separable bearing collar 4, which is preferably formed as a part of the usual housing 5 that incloses the attaching nuts or like means by which the hub and axle are held from endwise disengagement in the present class of wheels.

6 are counterpart inner and outer disks formed with central orifices adapted to fit the periphery of the cylindrical body portion of the hub, with the disks in bearing engagement against the respective collars 3 and 4 above described. Said inner and outer disks 6, have the usual separated relation shown, so as to provide an annular space surrounding the body of the hub 2 and adapted to contain the annular pneumatic cushion hereinafter described, and also provide a guide for the outer tire member to hold the same from any side movement.

7 are a counterpart pair of annular plate members or rings individual to the disks 6, aforesaid and arranged in the same planes as said disks to constitute separate outer annular portions or sections of the same. Said parts are held together in a separable manner by a circularly arranged series of offset radial ears 8 preferably formed on the disks 6 as shown, and by the transverse stud bolts hereinafter described, and which pass through orifices formed in the ears 8 and plate members 7 aforesaid.

9, are radially disposed corrugations in the side disks 6, for imparting lateral stiffness to the same.

10 is the tire member of the wheel of any ordinary and suitable annular formation, and which in the construction shown in the drawings is provided with inwardly extending annular side plates 11 adapted to fit between the annular plate members 7 above described and have movement between the same in a plane at right-angles to the axis of rotation of the parts. And as usual in the present type of wheels, the independent movement of the tire member 10 and its side plates 11 just described, is governed and restricted by a series of enlarged orifices 12 formed in the side plates 11 and adapted to encompass the transverse stud bolts above referred to, and by their greater size as compared with that of said bolts, permit the required amount of movement.

13 are the series of stud bolts above referred to, arranged in a circular cluster concentric with the axis of rotation of the wheel, and each consisting preferably of an ordinary screw-threaded bolt, the shank of which carries a sleeve 14, by which distance is imposed on the annular plate members 7 and their immediate accessories. In the present construction the number of offset ears 8 are less than the number of transverse stud bolts 13, preferably one to two as shown, and so that only a portion of said bolts are individual to said offset ears 8, the remainder of said bolts being attached solely to the annular plate members 7, intermediate of the offset ears 8, as illustrated in Fig. 1. With the described arrangement the assembled relation of the wheel parts is maintained by the last described portion of the transverse bolts 13, while the first described portion of said bolts 13 are released to permit the removal of one or the other of the central disks 6, for access to the interior of the wheel in repairing the annular pneumatic cushion, and other wheel parts located therein.

15 is the annular elastic cushion heretofore referred to, and which is formed in any usual manner and from any suitable pliable material.

16 are counterpart annular rings formed of metal or like rigid material, and secured to the inner portion of the annular cushion 15, aforesaid.

17 are outwardly extending holding flanges formed on the annular rings 16, aforesaid.

18 are a pair of counterpart annular disks, the central openings of which fit the cylindrical main body of the hub 2, over which they slip and have abutment against the inner faces of the annular disks 6, before described.

19 are inwardly extending holding flanges formed on the disks 18 and adapted for holding engagement with the outwardly extending flanges 17 of the rings 16, above described, to securely hold the annular elastic cushion 15 in proper position.

20 is a distance sleeve interposed between the aforesaid annular disks 8 to impose proper separated relation thereon, and in addition provide an inner bearing for the annular cushion 15, as shown.

21 are a series of transverse bolts passing through the hub collars 3 and 4, the disks 6 and 18, and an inturned annular flange 22 of the distance sleeve 20 to securely clamp the parts together when assembled.

23 is an annular bearing saddle formed with a concaved inner surface for bearing engagement with the transversely curved periphery of the annular elastic cushion 15 aforesaid. Said saddle is preferably formed of plate metal and in two substantially counterpart sections which meet and engage with each other at the median line of the saddle as shown, and preferably by means of an offset flange on the one section receiving the unflanged edge of the other, as shown.

24 are outwardly extending side flanges on the saddle 23, the peripheries of which fit the orifices in the side plates 11 of the tire member 10 to have bearing engagement with the same, and receive the thrust therefrom and in turn transmit the same to the annular elastic cushion 15 in the actual use of the wheel.

25 are a series of transverse orifices formed in the annular plate members 7, and in the side plates 11 of the tire member 10, and with the orifices adapted to register, when the respective parts are in concentric relation. In the present improvement said orifices 25 are adapted to receive locking bolts 26 of any ordinary and suitable construction, to firmly secure the described wheel parts from any independent movement. This provision is intended for use in case the pneumatic cushion 15 becomes entirely disabled and it is desired to return to the garage on a wheel rendered inelastic by the present provision.

Having thus fully described my said invention what I claim as new and desire to secure by Letters Patent, is:—

1. In a resilient wheel, the combination of an outer tire member having inwardly extending side plates, an inner hub member, an annular elastic cushion interposed between said tire and hub members, side disks secured to the hub member to inclose said cushion and provide a guide for the outer tire member, said side disks comprising central inner portions and outer annular portions connected together by offset ears, a plurality of transverse means connecting said outer annular portions together independent of said offset ears, a plurality of transverse means connecting said outer annular portions together and extending through said offset ears, and means for preventing undue independent movement of the tire member in relation to the hub member, the same comprising a series of enlarged orifices in the side plates of the outer tire member, said orifices encircling the transverse means aforesaid, substantially as set forth.

2. In a resilient wheel, the combination of an outer tire member having inwardly extending side plates, an inner hub member, an annular elastic cushion interposed between said tire and hub members, side disks secured to the hub member to inclose said cushion and provide a guide for the outer tire member, said side disks comprising central inner portions and outer annular portions connected together by offset ears, and means for preventing undue independent movement of the tire member in relation to the hub member, the same comprising enlarged orifices in the side plates of the tire member, a plurality of bolts having movement in said enlarged orifices and engagement with the annular portions of the side disks and the offset ears aforesaid, and a plurality of transverse bolts having like movement in said enlarged orifices and engagement with the annular portions of the side disks independent of the offset ears aforesaid, substantially as set forth.

3. In a resilient wheel, the combination of an outer tire member having inwardly extending side plates, an inner hub member, an annular elastic cushion interposed between said tire and hub members, side disks secured to the hub member to inclose said cushion and provide a guide for the outer tire member, said side disks comprising central inner portions and outer annular portions connected together by offset ears, the outer annular portions and the side plates of the tire member having a plurality of orifices disposed outside the elastic cushion aforesaid, and adapted to register and receive locking bolts when the aforesaid wheel parts are in concentric relation, substantially as set forth.

4. In a resilient wheel, the combination of an outer tire member having inwardly extending side plates, an inner hub member, an annular elastic cushion interposed between said tire and hub members and provided on its inner portion with rigid annular rings having outwardly extending flanges, side disks secured to the hub member to inclose the aforesaid elastic cushion and provide a guide for the outer tire member, annular disks arranged inside of said side disks and formed with inwardly extending flanges, a distance sleeve interposed between said annular disks, and a series of bolts passing through the parts to clamp the same together, substantially as set forth.

Signed at Chicago, Illinois, this 1st day of April 1912.

JOSEPH KOHLER.

Witnesses:
ROBERT BURNS,
HENRY MOE.

Copies of this patent may be obtained for five cents each, by addressing the "Commissioner of Patents, Washington, D. C."